T. MILLER.
Thill-Coupling.
No. 18,403. Patented Oct. 13, 1857.
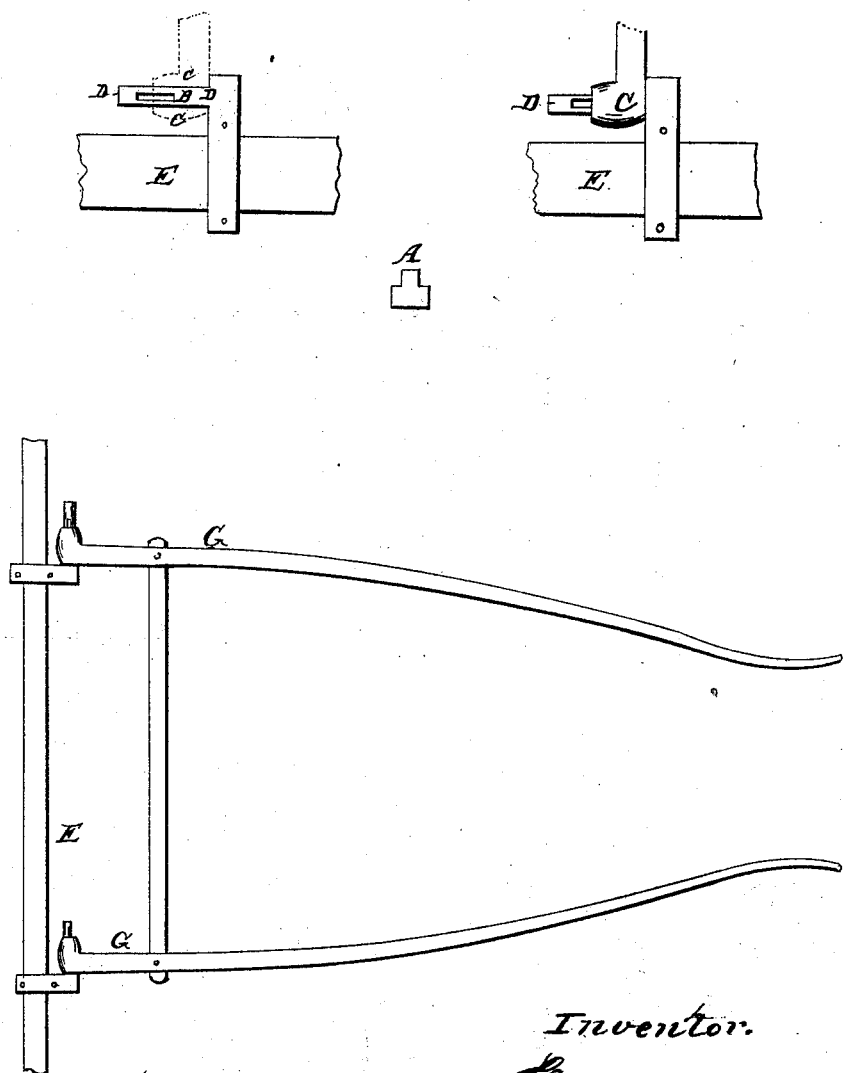
Witnesses.
L. E. Corson.
B. F. Vancourt.
Inventor.
Thomas Miller

UNITED STATES PATENT OFFICE.

THOMAS MILLER, OF WORCESTER TOWNSHIP, PENNSYLVANIA.

MODE OF FASTENING SHAFTS OR POLES TO CARRIAGES.

Specification of Letters Patent No. 18,403, dated October 13, 1857.

*To all whom it may concern:*

Be it known that I, THOMAS MILLER, of Worcester township, Montgomery county, Pennsylvania, have invented an Improvement in Fastening the Shafts or Tongue to the Front Axle of a Wagon; and I do hereby declare that the following is a full and exact description thereof, reference being had to the accompanying drawings and to letters of reference marked thereon.

In using my invention, it is necessary to have a hinge hook which is fastened to the axle in the usual way by a clip securely screwed on, the hinge hook being made of different sizes to suit the different vehicles to which it is applied. The shaft or tongue has an eye such as is commonly made. I make the projection or increased width all on one side, which is not however essential. The hook has a slit in it of about half an inch long and about one eighth wide shown in drawing as B. The eye has also a slit in it of the same width and half the length as the hook, and that is put in on the side nearest the shaft or tongue, so that the key A (made about one eighth of an inch thick and a quarter of an inch wide with a projection on, the diameter of the pin or hook, one quarter of an inch wider), will slip into the slit in the hook or pin when the shaft or tongue is held perpendicular or nearly so, then the shaft or tongue, being lowered to the position when in use the eye covers the projection in the key and thus keeps it in place very securely and certainly. The key being made of the same length or greater than the outside diameter of the eye, holds the eye firmly on. I make the key with a head on, only for the looks however. The eye of the shaft or tongue irons is marked C. The pin is marked D. The axle E, and the shafts G.

What I claim particularly as my invention is—

The combination and arrangement of key A, and the slit B, in the hook or pin to be used in connection with the other parts so as to constitute an improvement in, and a new mode of fastening tongue or shafts to axles in carriages and all kinds of vehicles.

THOMAS MILLER.

Witnesses:
L. E. CORSON,
B. F. VAN COURT.